US005554334A

United States Patent [19]

Kashio et al.

[11] Patent Number: 5,554,334

[45] Date of Patent: Sep. 10, 1996

[54] METHOD FOR PRODUCING SIMPLE PRINTING PLATE HAVING OPEN CELLS

[75] Inventors: Shigetora Kashio; Tsutomu Mizumi, both of Okazaki; Kuniyuki Takahashi, Urayasu, all of Japan

[73] Assignee: Toray Industries, Inc., Japan

[21] Appl. No.: 290,182

[22] Filed: Aug. 15, 1994

[30] Foreign Application Priority Data

Aug. 25, 1993 [JP] Japan .................................... 5-232527

[51] Int. Cl.[6] ........................... B29C 59/04; B29C 67/20

[52] U.S. Cl. .......................... 264/293; 264/321; 425/385

[58] Field of Search .................................... 264/293, 321; 100/169, 171, 176; 425/385, 367

[56] References Cited

U.S. PATENT DOCUMENTS

| | | | |
|---|---|---|---|
| 2,849,752 | 9/1958 | Leary | 425/385 |
| 3,368,014 | 2/1968 | Tijunelis | 425/385 |
| 3,387,330 | 6/1968 | Lemelson | 425/385 |
| 3,418,925 | 12/1968 | Wiggins | 100/176 |
| 3,506,749 | 4/1970 | Weissman | 264/321 |
| 3,592,134 | 7/1971 | Patterson, Jr. | 100/169 |
| 3,632,266 | 1/1972 | Winstead | 425/385 |
| 3,854,974 | 12/1974 | Sato et al. | 100/176 |
| 4,062,286 | 12/1977 | Ford | 101/375 |
| 4,064,205 | 12/1977 | Landsman | 264/293 |
| 4,078,031 | 3/1978 | Bishop | 264/293 |
| 4,142,849 | 3/1979 | Lewicki, Jr. et al. | 425/385 |
| 4,211,743 | 7/1980 | Nauta et al. | 425/385 |
| 4,942,434 | 7/1990 | Nakai et al. | 100/176 |
| 5,109,767 | 5/1992 | Nyfeler et al. | 101/23 |

FOREIGN PATENT DOCUMENTS

| | | | |
|---|---|---|---|
| 0330403 | 8/1989 | European Pat. Off. | 264/293 |
| 48-28786 | 9/1973 | Japan | 264/321 |
| 53-26856 | 3/1978 | Japan | 264/293 |
| 3-254982A | 11/1991 | Japan . | |

*Primary Examiner*—Allan R. Kuhns
*Attorney, Agent, or Firm*—Austin R. Miller

[57] ABSTRACT

According to the present invention there are provided method and apparatus for producing a simple printing plate having open cells, which method and apparatus area simple in construction and permit accurate and continuous production of the printing plate. More specifically, as the method there is provided a method of producing a simple printing plate having open cells by pressing both an embossing member having a relief image and a to-be-embossed member which is a sheet having open cells, in a heated state of the embossing member, allowing the relief image to be transferred to the to-be-embossed member, characterized in that the embossing member is attached to an embossing cylinder, the to-be-embossed member is attached to-be-embossed cylinder, one or both of the embossing cylinder and the to-be-embossed cylinder being in an arcuate form, and both cylinders are rotated in synchronism with each other, thereby pressing the embossing member and the to-be-embossed member in a rolling fashion.

3 Claims, 3 Drawing Sheets

METHOD FOR PRODUCING SIMPLE PRINTING PLATE HAVING OPEN CELLS

BACKGROUND OF THE INVENTION

1. Field of the Invention

The present invention relates to a method and apparatus for producing a simple printing plate, especially an ink-soaked printing plate for use as a stamp, a seal, or the like. Particularly, the invention is concerned with a method and apparatus for producing a simple printing plate or an ink-soaked printing plate, using means for bringing a to-be-embossed member, which is a sheet having open cells, into pressure contact under heating with an embossing member having an intaglio plate as a female die to transfer a desired relief image onto the sheet.

2. Description of the Prior Art

Printing plates are being improved day by day, and now resinous relief printing plates, planographic printing plates and intaglio printing plates, which are formed using photosensitive resins, are most popular as a substitute for the conventional metallic printing plates. On the other hand, such simple printing systems as copying machines and ink-soaked printing plates are being utilized not only for office works in companies but also even in homes at large.

Under these circumstances, it is required to provide a system which permits easy fabrication of a printing plate without requiring skill or the use of large-scale equipment. As one of the printing plates which meet such requirements, an ink-soaked printing plate is becoming more and more popular.

The ink-soaked printing plate is a printing plate having a relief image on the surface of a porous material, and by holding ink in the porous material it is possible to effect continuous printing without replenishing ink at every printing. The ink-soaked printing plate is used mainly as a seal or stamp. As the porous material there is usually employed a thermoplastic resin or rubber.

As a method for producing such an ink-soaked printing plate there is disclosed in JP 53-136080A a method wherein a thermoplastic resin powder having fine open cells therein is charged into a female die having a concave portion, followed by hot pressing, to obtain a printing plate for use as an ink-soaked printing plate. In JP 62-16188B there is disclosed a method wherein a masking member having an image is brought into close contact with a material for an ink-soaked printing plate such as rubber or a soft synthetic resin, followed by radiation of a laser beam through the masking member to remove the unmasked surface-layer portion, thereby affording a printing plate for use as an ink-soaked printing plate. In JP 55-90361 A is disclosed a method wherein a pasty material comprising a water-soluble salt powder and a synthetic resin powder is applied to the surface of a substrate to obtain a material for an ink-soaked printing plate, then this material and a die having a relief image are brought into pressure contact with each other under heating to form the relief image on the said material, followed by removal of the die and subsequent washing to remove the water-soluble salt powder, thereby affording a porous printing plate for use as an ink-soaked printing plate.

In JP 3-254982 A is disclosed a method wherein a cylindrical material for an ink-soaked printing plate mounted on a shaft member and having open cells is allowed to roll with respect to a flat embossing member having a relief image to afford a cylindrical printing plate for use as an ink-soaked printing plate.

Thus, conventional printing plates for use as ink-soaked printing plates are produced either by placing a porous material such as rubber or a thermoplastic resin into a die having a relief image and then applying heat and pressure or by fusion-bonding an image-bearing sheet to a porous foam under heating. However, the following problems have been encountered in the above methods:

(1) In the above methods there usually is employed a pressing machine, but a manufacturing process using this machine is inevitably required to be a batch type process, which is unsuitable for mass production and which does not permit continuous fabrication of printing plates. Besides, in the case of using a metallic die, the cost for producing the metallic die is high, (2) In the conventional manufacturing method wherein both an embossing member and a to-be-embossed member corresponding to a material for an ink-soaked printing plate are contacted and pressed together throughout the respective whole surfaces, it is difficult to apply pressure accurately and uniformly to the whole of the contact portion, so that a difference in a dimensional change of a relief image present between the embossing member and the to-be-embossed member is apt to occur locally, and (3) In the method disclosed in JP 3-254982 A, since it is necessary to attach the material for an ink-soaked printing plate to a shaft member, this method is not suitable for mass production; besides, since the transfer of a rotating force is done through both the embossing member and the to- be-embossed member, there occur such problems as a positional deviation of the relief image on the resulting printing plate and a dimensional change of the embossing member from the relief image.

SUMMARY OF THE INVENTION

It is an object of the present invention to produce a simple printing plate having a relief image size which changes little from a desired size.

It is another object of the present invention to provide a simple printing plate having a good relief image, free of any deficiency in the image area and free of scumming in the non-image area.

It is a further object of the present invention to provide a method which permits continuous production of a simple printing plate.

Firstly, the present invention resides in a method of producing a simple printing plate having open cells by pressing both an embossing member having a relief image and a to-be-embossed member which is a sheet having open cells, in a heated state of the embossing member, causing the relief image to be transferred to the to-be-embossed member, characterized in that the embossing member is attached to an embossing cylinder, while the to-be-embossed member is attached to a to-be-embossed cylinder, one or both of the embossing cylinder and the to-be-embossed cylinder being in an arcuate form, and both cylinders are rotated in synchronism with each other, thereby pressing the embossing member and the to-be-embossed member together in a rolling fashion.

Secondly, the present invention resides in a apparatus for producing a simple printing plate having open cells by which apparatus an embossing member having a relief image and a to-be-embossed member which is a sheet having open cells are pressed together in a heated state of the embossing member to transfer the relief image to the to-be-embossed member, the apparatus including:

an embossing cylinder for holding the embossing member over an arcuate surface;

a to-be-embossed cylinder for holding the to-be-embossed member over an arcuate surface; and a drive means for rotating the embossing cylinder and the to-be-embossed cylinder synchronously.

DESCRIPTION OF THE PREFERRED EMBODIMENTS

Figure 1:
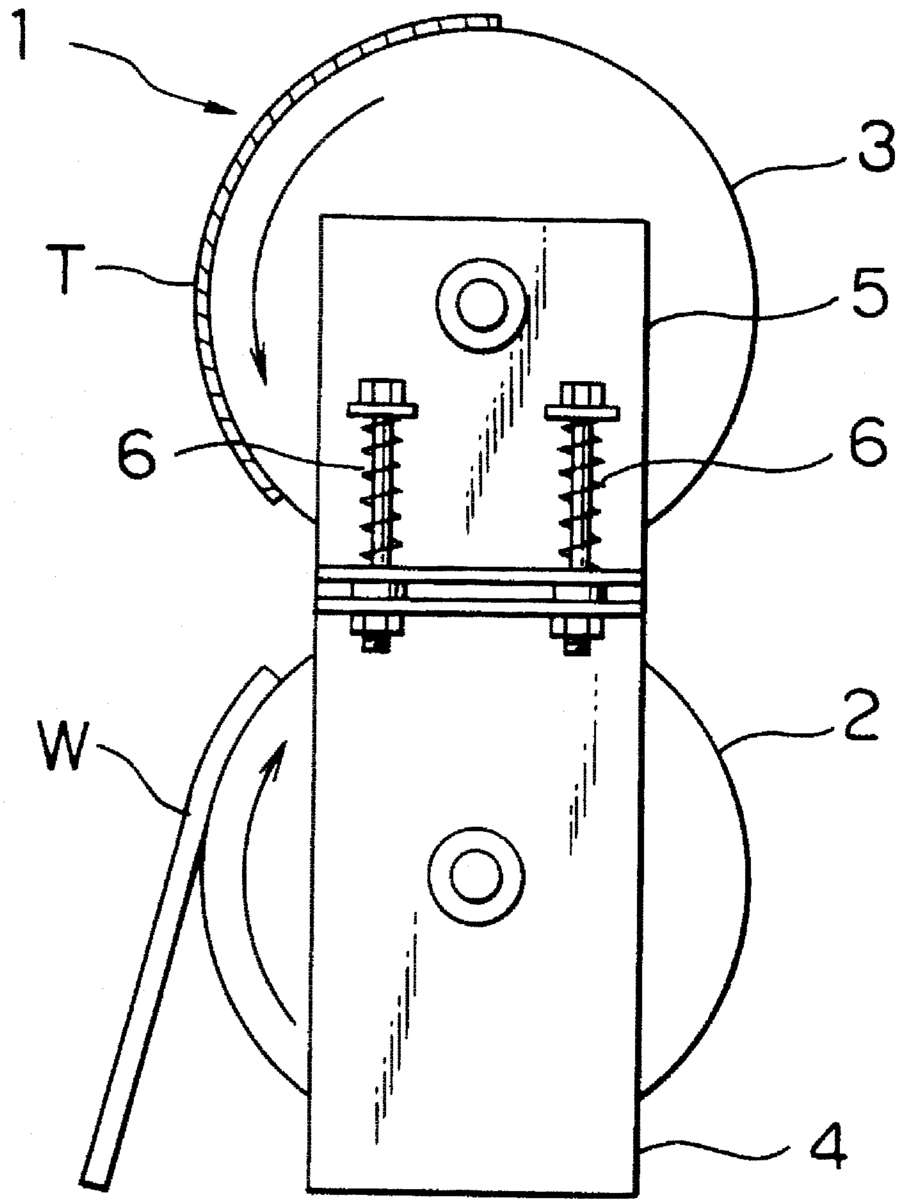
FIG. 1 is a front view showing apparatus and method according to an embodiment of the present invention.

This is a method of producing a simple printing plate having open cells by pressing both an embossing member having a relief image and a to-be-embossed member, which is a sheet having open cells, with a heated embossing member, to transfer the relief image to the to-be-embossed member. In accordance with an embodiment of the invention, the embossing member is attached to an embossing cylinder, while the to-be-embossed member is attached to a to-be-embossed cylinder; one or both of the embossing cylinder and the to-be-embossed cylinder are arcuate in form; and both cylinders are rotated in cynchronism with each other.

According to the above method, the embossing member which has a desired relief pattern is attached to the embossing cylinder, while the to-be-embossed member is attached to the to-be-embossed cylinder. Both cylinders are then rotated synchronously with the embossing member heated, and both members are pressed together in a rolling fashion and the pattern on the embossing member is transferred to the to-be-embossed member. In this case, the portion of the to-be-embossed member which has been contacted with the convex portion of the embossing member is melted by heat, so that the open cells are destroyed and the permeation of ink is no longer admitted. On the other hand, another portion of the to-be-embossed member does not melt because it is out of contact with the concave portion, and retains its ink permeating property through the open cells. Since the rotating force which is transferred between the embossing member and the member to be embossed is very weak, the relief image on the resulting printing plate is not deformed.

As the sheet having open cells, a foam sheet having open cells, especially a thermoplastic resin foam sheet having open cells, is preferred. The use of a foam permits reproduction of a fine image.

The pressure in the rolling type pressing operation is preferably in the range of 0.05 to 50 kgf/cm$^2$ (4.9 to 4,900 kPa). In this pressure condition, the embossing member and the to-be-embossed member are brought into pressure contact with each other and the pattern on the former is transferred to the latter.

It is preferred that the embossing cylinder and the to-be-embossed cylinder be connected to each other through an elastic member, e.g. coiled spring, plate spring, air spring or rubber, having a stroke capable of following changes in the thickness of the to-be-embossed member. By so doing, it is no longer required to adjust the degree to which the embossing member is to be pushed into the to-be-embossed member at every change in the thickness of the latter member.

As the embossing member having a relief image, it is desirable to use one formed reliefwise from a photosensitive resin composition. In contrast with a metallic embossing member which requires much labor in its fabrication, the use of a photosensitive resin composition makes simple fabrication of an embossing member possible.

In the present invention, one or both of the foregoing embossing cylinder and to-be-embossed cylinder are made arcuate in shape, whereby it is made possible to separate the cylinder(s) and the member(s) from each other at portions other than the pressed portion, and hence it is possible to produce printing plate continuously.

According to the present invention, as an apparatus suitable for use in practising the method of the invention there is provided an apparatus of producing a simple printing plate having open cells by pressing both a heated embossing member having a relief image and a to-be-embossed member which is a foam sheet having open cells, to transfer the relief image to the to-be-embossed member, the apparatus including:

an embossing cylinder for holding the embossing member over an arcuate surface;

a to-be-embossed cylinder for holding the to-be-embossed member over an arcuate surface; and a drive means for rotating both cylinders synchronously.

According to the apparatus of the above construction, the embossing member is held by the arcuate surface of the embossing cylinder, while the to-be-embossed member is held by the arcuate surface of the to-be-embossed cylinder, and by pressing both members in a rolling fashion while allowing both cylinders to rotate synchronously, the relief image on the embossing member is transferred to the member to be embossed, to afford a printing plate.

In the apparatus it is desirable that the embossing cylinder and the to-be-embossed cylinder be urged together through an elastic member such as, for example, coiled spring, plate spring, air spring or rubber, because it is possible to eliminate the need of adjusting degree to which the embossing member is pushed into the to-be-embossed member for every change in the thickness of the latter member.

The embodiments of the present invention will be described below in more detail with reference to the accompanying drawings.

Figure 2:
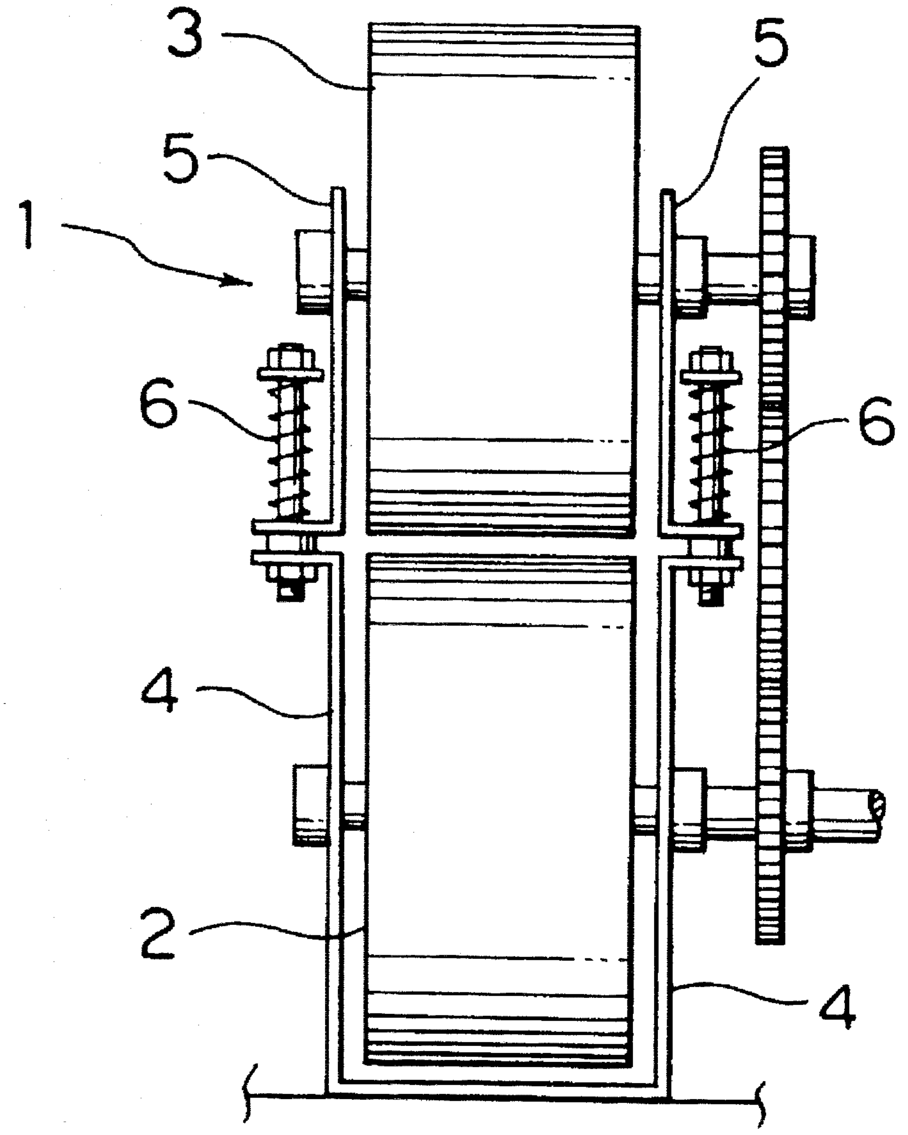
FIG. 2 is a side view of the apparatus.
Figure 3:
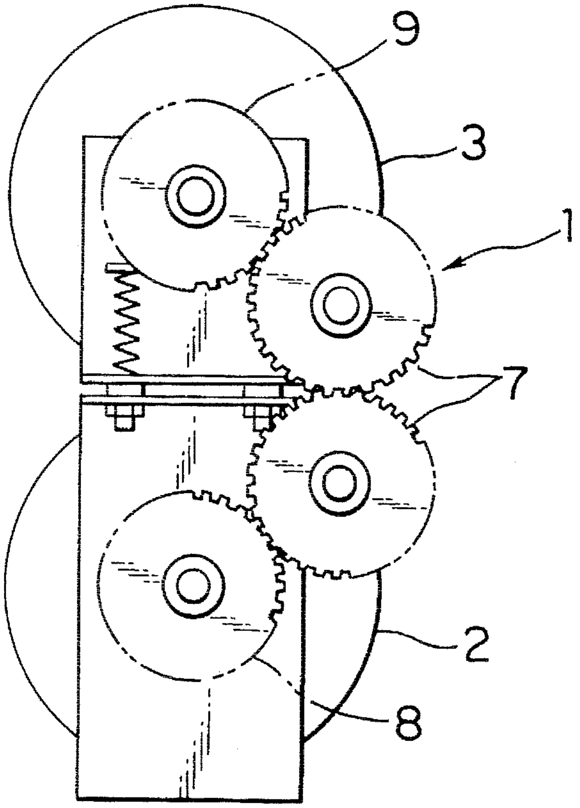
FIG. 3 is a rear view of the apparatus.

FIG. 1 is a front view showing the whole of a simple printing plate manufacturing apparatus embodying the invention, FIG. 2 is a side view thereof, and FIG. 3 is a rear view thereof.

In these figures, the reference numeral 1 denotes an apparatus for producing a simple printing plate having open cells, which apparatus is provided with a to-be-embossed cylinder (hereinafter referred to as "impression cylinder") 2 for holding a member W to be embossed and an embossing cylinder (hereinafter "plate") 3 for holding an embossing member T. Both cylinders are mounted on respective shafts, which shafts are supported by supporting base members 4 and supporting plates 5, respectively. The supporting base members 4 and the supporting plates 5 are connected through two pairs of springs 6 as elastic members which are disposed in front and rear positions.

As shown in FIG. 3, a driving gear 8 and a driven gear 9 are connected to the impression cylinder 2 and the plate cylinder 3, respectively, and both gears are in mesh with each other through a pair of connecting gears 7 disposed in inner positions. Both cylinders are rotated synchronously by means of motor (not shown) connected to the impression cylinder 2.

The following is a detailed description of each component portion.

The material to be used for the embossing member T is not specially limited if only it can withstand the pressure and temperature in the rolling type pressing. As a preferred example is mentioned a metallic plate obtained by etching a metallic plate such as zinc or copper plate, or a photosensitive resin intaglio plate obtained by bringing a polyester film having a desired pattern into close contact in vacuum with a printing plate material of a photosensitive resin, followed by radiation of ultraviolet light and subsequent development to remove the unirradiated portion.

As the photosensitive resin printing plate material there may be used a photosensitive resin if only the resulting photosensitive resin intaglio plate possesses heat resistance. But since a forming process using rolling type rolls is essential for obtaining a printing plate for use as an ink-soaked printing plate, it is desirable to use a thermoplastic resin which exhibits a high hardness at the molding temperature. By using such a photosensitive resin there will be obtained an ink-soaked printing plate having a sharp and good image and hence printed matter having such image.

The to-be-embossed member is generally called a workpiece. The workpiece W used in the present invention is in the form of sheet having open cells. As examples of the material of the work there are mentioned such thermoplastic resins as polyurethane, polyacetal, polyethylene, polypropylene, polystyrene and polyamide.

For example, as disclosed in JP 47-39212B, the sheet having open cells is obtained by forming a mixture of a polyolefin resin and calcium sulfite or calcium sulfate into sheet-like form in accordance with an extrusion method and then treating the sheet with an inorganic acid which dissolves calcium, or as disclosed in JP 574-2651B, such sheet is obtained by kneading a powdery substance and a thermoplastic polyolefin resin, the powdery substance capable of being dissolved in water or in an aqueous acid solution, then forming the resulting mixture into a desired shape, followed by washing the formed product with water. Sheet obtained by subjecting a foam sheet having closed cells to needle-punching or the like to destroy the cell-to-cell walls and thereby open the cells into continuous cells is also employable. The sheet having open cells is preferably a foam sheet because it is possible to attain fine open cells and hence possible to obtain a fine image.

For performing the transfer of a relief image from the embossing member T to the work W by rolling type pressing, first the embossing member T is attached to the plate cylinder 3 and the work W to the impression cylinder 2.

As to the mounting method, since the forming operation is performed under a linear pressure, it suffices for the work W to be filled only at its portion to be pressed first by means of a gripper provided on the impression cylinder 2 side. As to the size of the plate cylinder 3 and that of the impression cylinder 2, it is preferable that they be as large as possible to the extent of not causing distortion of the embossing member T and the work W. For example, the diameter of each cylinder is in the range of 100 to 1,000 mm.

The transfer of a relief image may be done in a one-by-one fashion for each work piece W, but it is also possible to perform the relief image continuously for a plurality of workpieces W.

Heretofore, in the case where a sheet having open cells is used as work W in the transfer of a relief image, it has been necessary to adjust the amount of the embossing member T to be pushed in at every change from one work W to another different in thickness because both too much or too little of such amounts would not afford a satisfactory printing plate. The reason is that the convex portion of the embossing member T must contact the work W, while the bottom of the concave portion must not come into contact therewith. In the method of the present invention, in order to eliminate the need of adjusting the amount of the embossing member T to be pushed in at the time of change in the thickness of work W, it is desirable that springs 6, or elastic members, be interposed between the plate cylinder 3 and the impression cylinder 2. In this case, the elastic member preferably has a stroke (an allowable range of expansion and contraction) sufficient to permit the relief image transfer and capable of coping with a change in the thickness of work W. In the presence of such elastic member it is possible to produce printing plates continuously without adjusting the amount of embossing member to be pushed in.

It is preferable that the rolling type pressing pressure used in the invention be in the range of 0.05 to 50 kgf/cm$^2$ (4.9 to 4,900 kPa). If the pressing pressure is lower than 0.05 kgf/cm$^2$ , the amount of the embossing member T pushed into the work W will be insufficient, so that it becomes impossible to effect uniform heating of the work at contact portion and both melted portion and unmelted portion occur on the surface of the work which should be melted by heat. The resulting porduct is meaningless as a printing plate. On the other hand, if the pressing pressure exceeds 50 kgf/cm$^2$, the amount of the embossing member pushed into the work will become too large, so that the bottom of the embossing member comes into contact with the surface of the work and the even the surface portion of the work where there should remain open cells is heat-melted, thus resulting in loss of the printing portion.

The pressing for the relief image transfer can be done while maintaining the surface of the embossing member T at a temperature of 80° to 150° C. using a heater provided on the plate cylinder 3 side and allowing a desired portion of the foam sheet to be melted by that heat. If this temperature is lower than 80° C., the work will not be melted to a satisfactory extent at the time of pressing, so that it becomes difficult to effect an exact transfer of the relief image. On the other hand, if the temperature exceeds 150° C., the work will be melted to excess, thus resulting in the transferred relief image being crushed or the occurrence of the waving phenomenon of the printing plate obtained.

The heat-melted portion of the work corresponds to the convex portion of the embossing member T. This portion becomes a non-image area because the cells in this portion are crushed and the ink held within the sheet does not permeate up to the surface of the printing plate. On the other hand, the portion of the work corresponding to the bottom of the concave portion does not come into contact with the embossing member so is not heat-melted, and the ink held within the sheet permeates up to the surface, so that this portion serves as a printing area.

According to the simple printing plate manufacturing method of the present invention, as set forth above, a desired relief image formed on an intaglio plate can be exactly transferred batchwise or continuously to the sheet surface having open cells by rolling type pressing.

How to fabricate simple printing plates using the above apparatus will be described below concretely.

EXAMPLE 1

An embossing member T constituted by a photosensitive resin printing plate material, "Torelief WS-83EP" (relief depth: 0.55 mm, a product of Toray Industries Inc.) as an intaglio plate of 100×150 mm (head to tail: 150 m) was attached to plate cylinder 3 having a diameter of 250 mm and held at 120° C. The surface temperature of the embossing member was 105° C. On the other hand, a foamed polyolefin sheet ("MP Sheet," a product of Yamahachi Chemical Co.) having open cells and having a size of 110×160 mm and a thickness of 3 mm, as a work W, was attached only at the front end thereof to an impression cylinder 2 having the same size as that of the plate cylinder.

The plate cylinder 3 and the impression cylinder were connected together through springs 6 so as to give a pressing pressure of about 25 kg/cm$^2$ (about 2,450 kPa) and stroke of 3 mm.

Nip width between rolls (a width of deformed contact between the embossing member T and the work W under pressure) was set at 12.3 mm and both cylinders 3, 2 were rotated synchronously to effect pressing. The thus-pressed portion of the work W between both cylinders 3 and 2 was then separated from the impression cylinder 2 and discharged to afford a printing plate. The amount of the printing plate pushed in by the embossing member was 0.3 mm.

The printing plate thus obtained involved no problem and had a pattern transferred from the embossing member. In its portion corresponding to the concave portion of the embossing member there remained open cells.

Then, ink was injected into the image area of the printing plate by means of a syringe, which ink was allowed to be dispersed throughout the printing area over a period of 2 hours. The thus ink-soaked printing plate was then affixed to a stamp base, which was then pushed against paper. As a result, the image area was transferred beautifully to the paper. No scumming was observed in the non-image area.

EXAMPLE 2

Pressing was performed while the plate cylinder 3 and the impression cylinder 2 were rotated synchronously at a roll-to-roll nip width of 12.3 mm and under the same conditions as in Example 1 except that the thickness of the work, or the sheet having open cells, was changed to 4 and 5 mm. The work was discharged while being pressed between both cylinders 3 and 2. The amounts of the resulting printing plate pushed in by the embossing member were 0.30 mm in the case of the sheet thickness of 4 mm and 0.31 mm in the case of the sheet thickness of 5 mm.

Thus, it turned out that the amount of the printing plate pushed in by the embossing member was constant irrespective of the change in the work thickness from 3 mm to 4 and 5 mm.

When ink was injected into the image area of the printing plate and printing was performed using such an ink-soaked printing plate, there could be obtained good prints.

COMPARATIVE EXAMPLE 1

Only the plate cylinder 3 was rotated without synchronous rotation thereof with the impression cylinder 2 to afford a printing plate. Upon observation of the image area of the printing plate thus obtained there was found a partial deviation from a desired position.

EXAMPLE 3

A positive film was put on a photosensitive resin printing plate material, "Torelief WS-50EP"(a product of Toray Industries Inc.) having a size of100×150 mm (head to tail: 150 mm) and then exposed to light for 0.5 minute using an ultra-high pressure mercury vapor lamp of 2 kw. Unexposed area was washed out for 1 minute by means of a brush type developing apparatus using neutral water. The relief depth was 0.42 mm. The thus-processed product was used as an embossing member T having an intaglio shape.

Using the apparatus described in Example 1, the procedure of Example 1 was repeated except that the following conditions were adopted.

The above embossing member T was attached to the same plate cylinder 3 as that used in Example 1, while the same work (provided the thickness was 4 mm) as in Example 1 was put on a stainless steel plate having a thickness of 1 mm without being attached to the impression cylinder 2. The stainless steel plate with the work thereon was inserted between the impression cylinder 2 and the plate cylinder 3, then the plate cylinder 3 and the stainless steel plate were driven simultaneously, allowing the cylinder 3 to rotate while maintaining the roll-to-roll nip width at 12.3 mm, to effect pressing. The work was pressed between the plate cylinder 3 and the stainless steel plate and then discharged as a printing plate. The amount of the embossing member pushed into the printing plate was 0.3 mm, same as that of the printing plate obtained in Example 1 in which the work was attached to the impression cylinder 2.

The printing plate involved no problem and had a pattern transferred from the embossing member. In its portion corresponding to the concave portion of the embossing member there remained open cells.

Then, ink was injected into the sheet in the image area of the printing plate by means of a syringe, and the printing plate was allowed to stand for about one one day. The thus ink-soaked printing plate was then affixed to a stamp base, which was then pushed against paper. As a result, the image area was transferred beautifully to the paper. No scumming was observed in the non-image area.

Thus, also by maintaining the work in the state of a plane, there could be obtained the same printing plate was in Example 1.

Contrary to Example 3, the embossing member T may be maintained in a planar state in the production of such printing plate.

Figure 4:
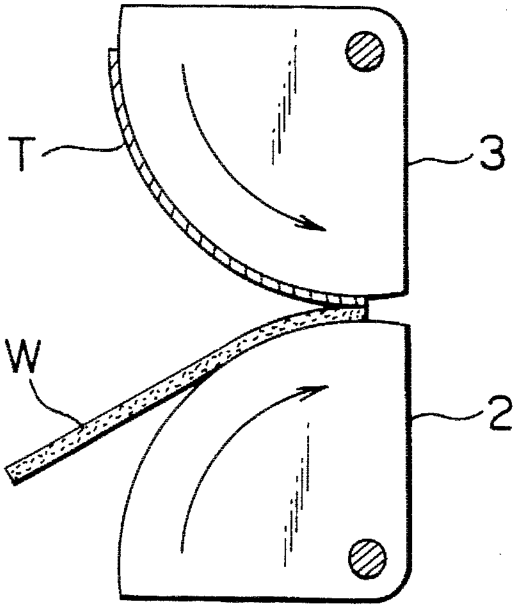
FIG. 4 is a schematic front view illustrating a method of another embodiment of the present invention.

Although in the apparatus used in each of the above Examples both impression cylinder 2 and plate cylinder 3 were cylindrical, both may be arcuate as shown in FIG. 4 for example. By using such an arcuate shape, that is, by using only a portion of a cylindrical shape, it is made possible to reduce the size of the apparatus.

What is claimed is:

1. In a method of embossing a relief pattern into an open-cell printing plate, wherein said relief pattern is embossed in an impression surface of said printing plate by contact with a heated embossing die, the steps which comprise:

(a) attaching said heated embossing die to a rotatable arcuate embossing support, (b) providing a rotatable arcuate impression support for said printing plate;

(c) providing a movable and yieldable connection continuously urging said embossing support and said impression support toward each other, (d) synchronously rotating, in unison and in a common direction, said embossing support and said printing plate support in a manner continuously to advance and press both said heated embossing surface and said impression surface toward each other, with said printing plate advancing while compressed between them, (e) controlling the pressing to a pressure of 0.05 to 50 $kgf/cm^2$, and (f) controlling the heating of said heated embossing die to a surface temperature of 80°–150° C., whereby said embossing support and said impression support are yieldably movable toward and away from each other to follow changes of thickness of said priming plate.

2. The method defined in claim 1 wherein said printing plate is a foam sheet.

3. The method defined in claim 3 wherein said embossing support and said impression support are cylinders.

* * * * *